United States Patent
Zhang

(10) Patent No.: US 11,372,124 B2
(45) Date of Patent: Jun. 28, 2022

(54) FIRST-BREAK PICKING OF SEISMIC DATA AND GENERATING A VELOCITY MODEL

(71) Applicant: GeoTomo LLC, Houston, TX (US)

(72) Inventor: Jie Zhang, San Diego, CA (US)

(73) Assignee: GeoTomo, LLC, Houston, TX (US)

( * ) Notice: Subject to any disclaimer, the term of this patent is extended or adjusted under 35 U.S.C. 154(b) by 252 days.

(21) Appl. No.: 16/387,672

(22) Filed: Apr. 18, 2019

(65) Prior Publication Data

US 2019/0324167 A1 Oct. 24, 2019

Related U.S. Application Data

(60) Provisional application No. 62/659,413, filed on Apr. 18, 2018.

(51) Int. Cl.
*G01V 1/30* (2006.01)
*G06F 17/18* (2006.01)

(52) U.S. Cl.
CPC .............. *G01V 1/305* (2013.01); *G06F 17/18* (2013.01); *G01V 2200/14* (2013.01); *G01V 2210/22* (2013.01); *G01V 2210/41* (2013.01); *G01V 2210/6222* (2013.01)

(58) Field of Classification Search
CPC .............. G01V 1/305; G01V 2200/14; G01V 2210/41; G01V 2210/22; G01V 2210/6222; G06F 17/18
See application file for complete search history.

(56) References Cited

U.S. PATENT DOCUMENTS

| | | | | |
|---|---|---|---|---|
| 9,857,489 B2* | 1/2018 | Lambare | ................ | G01V 1/282 |
| 10,386,519 B2* | 8/2019 | Colombo | ................ | G01V 1/362 |
| 10,519,771 B2* | 12/2019 | Li | ................ | E21D 9/108 |
| 10,663,610 B2* | 5/2020 | Craft | ................ | G01V 1/36 |
| 10,914,854 B2* | 2/2021 | Colombo | ................ | G01V 1/364 |
| 2015/0168576 A1* | 6/2015 | Craft | ................ | G01V 1/38 702/14 |
| 2015/0346367 A1* | 12/2015 | Lambare | ................ | G01V 1/303 367/73 |
| 2017/0176617 A1* | 6/2017 | Colombo | ................ | G01V 1/362 |
| 2017/0218757 A1* | 8/2017 | Li | ................ | G01V 1/04 |
| 2019/0302297 A1* | 10/2019 | Colombo | ................ | G01V 1/362 |
| 2019/0302298 A1* | 10/2019 | Colombo | ................ | G01V 1/364 |
| 2019/0331817 A1* | 10/2019 | Colombo | ................ | G01V 1/364 |

OTHER PUBLICATIONS

R. Tondi and R. D. Franco, "Accurate assessment of 3D crustal velocity and density parameters: Application to Vesuvius data sets", Physics of the Earth and Planetary Interiors 159 (2006) 183-201 (Year: 2006).*

* cited by examiner

*Primary Examiner* — Douglas Kay
(74) *Attorney, Agent, or Firm* — Conley Rose, P.C.

(57) ABSTRACT

A new method for iteratively picking the seismic first breaks and conducting imaging of the near-surface velocity structures in an iterative fashion is provided that the first-break picks of the input seismic data are applied to image the near-surface velocity structures and the calculated travel times associated with the updated velocity structures are applied to help refine the first-break picks in the first break picking process until first-break picks satisfy a number of quality control criteria, statics solutions are optimized, and the near surface imaging reaches an acceptable data misfit. This invention produces a velocity model that can be used for near surface statics corrections or for the prestack depth migration.

18 Claims, 16 Drawing Sheets

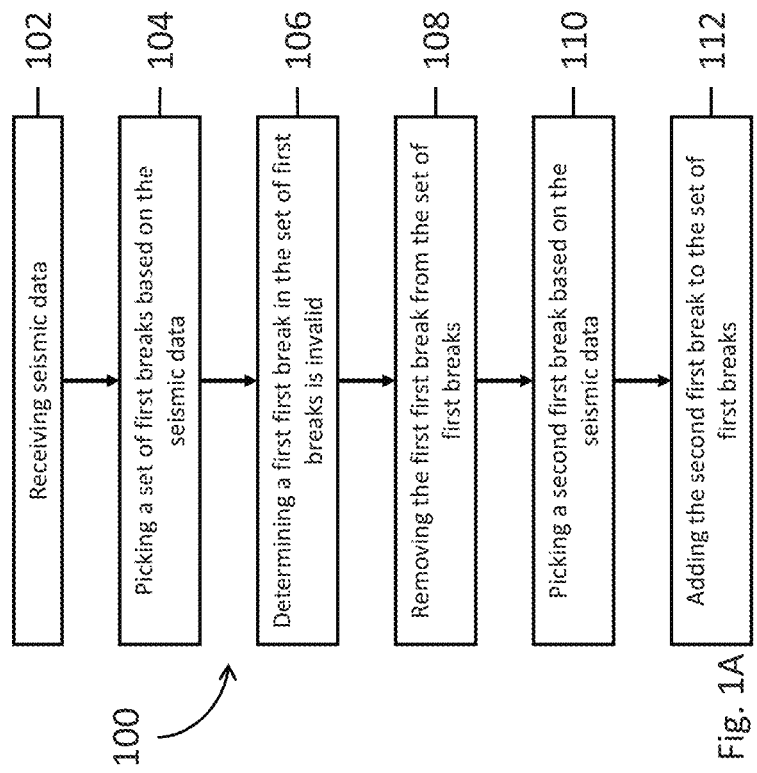

FIRST-BREAK PICKING OF SEISMIC DATA AND GENERATING A VELOCITY MODEL

CROSS-REFERENCE TO RELATED APPLICATIONS

The present application claims benefit of U.S. provisional application No. 62/659,413 filed Apr. 18, 2018, and entitled "First-Break Picking of Seismic Data and Generating a Velocity Model," which is hereby incorporated herein by reference in its entirety.

BACKGROUND

Seismic surveys are used to understand the shape and attributes of subsurface formations or layers of the earth. Seismic waves travel through the subsurface of the earth at different speeds based on the material they are traveling through. As the seismic waves encounter different types of rock or soil, the waves can be partially refracted and partially reflected. As these seismic waves are redirected back to the surface, they can be recorded and analyzed to determine the likely subsurface structures at different depths in a region. Analysis of seismic surveys may indicate the potential presence of hydrocarbons or useful minerals.

A seismic survey utilizes one or more sources and one or more receivers to collect information about phase and amplitude of seismic waves. The sources and receivers used in a seismic survey can be placed on the earth's surface or below the surface, such as in a well or a drilled hole. For marine environments, sources and receivers may also be placed in the water or on the seafloor. When multiple sources and multiple receivers are used, some may be located on the earth's surface, while others are placed below the surface or in the water.

Seismic data can produce a large number of seismic traces. Seismic traces include data regarding ground movement over a period of time and are recorded at receivers, which can be geophones, hydrophones, or other seismic monitoring equipment. Receivers may be deployed at approximately constant intervals. While passive collection of ground movement may be performed, a seismic survey may use sources to create seismic waves from a known origin. A source is the location where a seismic wave originates. A shot is a release of energy at a source to create seismic waves, such as a single blast of dynamite or vibrator. The location where the shot occurs is called a source. A shot may be performed at a source to create seismic waves. Multiple shots may be performed at different sources and times.

Seismic data from land or shallow marine environments may present problems, such as geometry errors and noisy or bad traces. For geometry errors, an incorrect shot or receiver location may placed in the trace header of the data due to a field operational problem. Sources or receivers may not be placed at the exact locations designed in the seismic survey due to surface obstacles. Environment interference or recording system malfunctions may lead to noisy data or bad traces. The noisy data or bad traces may be fixed or removed before further data processing. If the problems stay in the data, the subsequent processing may produce incorrect results. Geometry error corrections and trace editing may be completed before other processing.

The data collected with a seismic survey can be processed to produce an estimated image of the subsurface of the earth in a region. For example, in reflection seismology, seismic reflection data is extracted from raw records and processed to image the stratigraphic structures through prestack depth migration, a process that relies on an accurate estimate of the earth velocity model. Migration and model building are two important categories of seismic imaging methods.

Creation of a model of the subsurface is further complicated by the presence of near-surface structures in the near-surface weathering layer, where low velocity anomalies may occur. All deep reflection raypaths must go through the near surface weathering layer twice, down-going and up-going, and then back up to surface receivers. Thus, complex near-surface structures may severely distort the seismic data gathered by a seismic survey. Near-surface structures can be very complex due to their relatively young age in the geological process.

Machine Learning (ML) is a field of Artificial Intelligence (AI) in computer science that gives computer systems the ability to train itself to perform a task, based on data. Using ML, a computer system may train itself to perform a task without being explicitly programmed how to perform the task.

In ML, a convolutional neural network (CNN, or ConvNet) is a class of deep, feed-forward artificial neural networks that may be applied to analyzing visual imagery. CNNs may use a variation of multilayer perceptrons designed to require minimal preprocessing. They are also known as shift invariant or space invariant artificial neural networks (SIANN), based on their shared-weights architecture and translation invariance characteristics.

In ML, Reinforcement Learning (RL) is an area inspired by behaviorist psychology, concerned with how software agents ought to take actions in an environment so as to maximize some notion of cumulative reward. The problem, due to its generality, is studied in many other disciplines, such as game theory, control theory, operations research, information theory, simulation-based optimization, multi-agent systems, swarm intelligence, statistics and genetic algorithms.

SUMMARY

Quality control can be used in making first-break picks of seismic surveys. The quality control may include shot reciprocity and shot similarity comparisons. An iterative approach may also be used, as well as jointly solving first-break picking, pick quality control, geometry quality control, structural imaging, and statics optimization. AI, ML, CNNs, and RL may be applied to first break picking, seismic processing, and imaging.

BRIEF DESCRIPTION OF THE DRAWINGS

For a detailed description of exemplary embodiments of the invention, reference will now be made to the accompanying drawings in which:

FIG. 1A shows a flow diagram for a method of picking first breaks;

NOTATION AND NOMENCLATURE

Figure 1B:
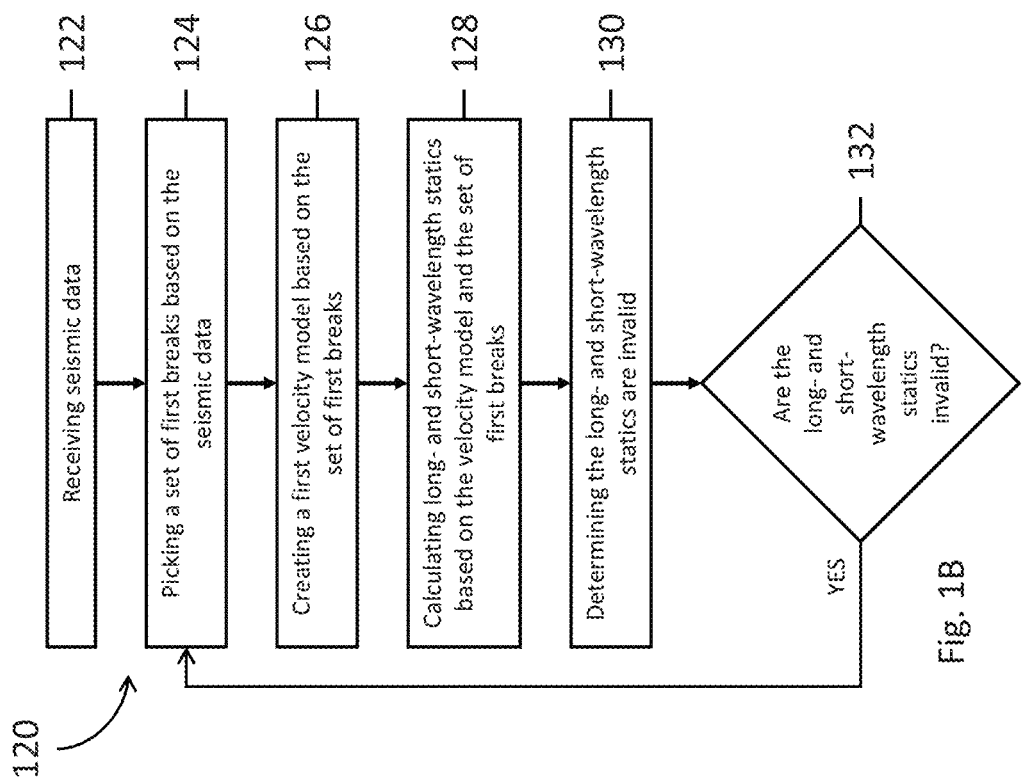
FIG. 1B shows a flow diagram for a method of picking first breaks and determining long- and short-wavelength statics.

Certain terms are used throughout the following description and claims to refer to particular system components. As one skilled in the art will appreciate, a component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1A shows a flow diagram for a method 100 of picking first breaks. The method 100 includes receiving seismic data (block 102), picking a set of first breaks based on the seismic data (block 104), determining a first first break in the set of first breaks is invalid (block 106), removing the first first break from the set of first breaks (block 108), picking a second first break based on the seismic data (block 110), and adding the second first break to the set of first breaks (block 112). The set of picked first breaks may include multiple first breaks. The method 100 may determine that multiple first breaks are invalid. The method 100 may remove all first breaks from the set of first breaks that were determined to be invalid. The method may pick a different number of new first breaks (more or fewer) and add them to the set of first breaks than were determined to be invalid. The method 100 may determine if any of the new first breaks are invalid and remove them from the set of first breaks. The method 100 may pick new first breaks to replace any first breaks removed from the set of first breaks and repeat that process iteratively until all the first breaks are determined to be valid.

A first break may be determined to be invalid by performing quality control (QC) on the first break. For example, a first break pick that occurs outside of a certain time window in which first breaks are expected may be a bad pick and may be discarded. Other quality control mechanisms for picks are discussed elsewhere in this specification. As first-break picks are removed, it may be necessary to pick and quality control additional first-breaks to fill in holes created by the removal of other first break picks.

FIG. 1B shows a flow diagram for a method 120 of picking first breaks and determining long- and short-wavelength statics. The method 120 includes receiving seismic data (block 122), picking a set of first breaks based on the seismic data (block 124), creating a first velocity model based on the set of first breaks (block 126), calculating long- and short-wavelength statics based on the velocity model and the set of first breaks (block 128), determining the long- and short-wavelength statics are invalid (block 130), and if the long- and short-wavelength statics are invalid (block 132) picking another set of first breaks based on the seismic data (block 124).

Incorrect geometry may be identified and corrected. The geometry may be incorrect as a source or receiver was not placed at the designed location for the seismic survey. This misplacement may be due to physical obstacles preventing the designed placement or other errors and may not be documented. Such errors may be identified and corrected through analysis of the seismic data. ML may be used to identify and correct incorrect geometry. A grid search algorithm may be used for identifying or correcting incorrect geometry.

First-arrival/refraction travel time imaging may be performed to model the near-surface velocity structures. Seismic data usually includes collection of data from multiple seismic waves. The first arrivals are the first waves that reach the receivers from a source. The first break picks are the arrival times of the first arrivals. The purpose of first-break picking is to obtain the arrival times of these first arrival waves in the seismic data. These types of waves may reach the receivers through direct, refraction, transmission, diffraction, or reflection mechanisms (see Zhang, J., and Toksoz, M. N., *Nonlinear refraction travel time tomography*, Geophysics, Vol. 63, No. 5, 1726-1737 (1998)). The first arrivals recorded by the receivers are mostly associated with the near-surface velocity structures. The first-arrival or refraction travel times extracted from these early waves can be modeled and interpreted in terms of the near surface velocity structures.

The first-arrival travel time tomography method generally assumes a grid-based model with many small cells, where each cell represents a velocity value for a volume of earth. Because grid model representation is flexible enough to represent any complex model, first-arrival travel time tomography is often applied to solve complex velocity structure imaging, such as for near-surface structures. Starting from an initial velocity model, the first-arrival travel time tomography method calculates the first-arrival travel times, inverts the travel time picks, and updates the velocity model. But a given set of first-arrival travel times may represent numerous different velocity models (the solutions are non-unique). Since the solutions may be non-unique, various constraints may be applied in order to limit the number of potential solutions, such as regularizing the model with derivatives between cells, applying a priori interface information by using a known interface to constrain the update, or applying a refraction travel time migration image to separate regulation zones. The first-arrival/refraction travel time imaging results in an estimated velocity model representing the near-surface structures that may be present. As the solutions may be non-unique, the velocity model may be incorrect.

Other methods that may be used alone, in place of, or in conjunction with the first-arrival imaging include: refraction delay-time method, refraction travel time migration, generalized linear inversion, the first-arrival travel time tomography, joint travel time and waveform tomography, waveform inversion, and waveform envelope inversion with simultaneous constraints that may include a priori information, Tikhonov regularization, and cross gradients. If two or more imaging methods are used, these methods may be applied jointly or alternately within each inversion iteration. However, if travel-time picks are inaccurate, none of the above methods may produce reliable and accurate results.

The refraction delay-time method assumes a layered velocity model with a high-velocity refractor. Provided that velocities are known, a "delay time" associated with a source or a receiver can be inferred from the refraction travel time data. The delay time is also a function of the local refractor depth right below the source or receiver. The velocities of the overburden layer (weathering layer above the refractor) and refractor can be inferred from the refraction travel time data as well. Thus, the depth of the entire refractor can be interpolated with the delay-time solutions under all of the sources and receivers. The refractor depth (or shape) can be used to constrain grid-based travel time tomography.

Generalized linear inversion (GLI) may be used to create or refine a velocity model. GLI assumes a velocity model with multiple layers, and refraction travel times associated with each layer are available. Applying linearized inversion to invert layered velocity structures, one can fit the refraction travel times with calculated synthetics and update the velocity in each layer and update the shape (depth) of each refractor as well.

Waveform inversion may be used to provide high-resolution modeling of near-surface structures. Early-arrival waveform data is associated with near-surface structures and contains more information than just the travel times. Inverting waveform data is appealing because it may help to reconstruct a high-resolution image of the near-surface structures. However, current linearized inversion technology may lead to a problem known as "cycle-skipping," because of a poor starting model. Many studies have been conducted to solve the "cycle-skipping" problems with promising results.

Waveform envelope inversion may be used to help solve the "cycle-skipping problem," since the input waveform envelope data include low frequency components (such as data between 1-5 Hz). Low-frequency data includes information about long wavelength structures. Identification of the long wavelength structures helps to avoid "cycle skipping problem." Since collected seismic data is typically at a frequency above 5 Hz, one approach is to extract a waveform envelope from the waveform data and invert the waveform envelope in the frequency range of 0-15 Hz. The envelope inversion approach is same with the waveform inversion, except for the input data.

The velocity model may be used to calculate near surface statics. The velocity model of near-surface structures can be used to calculate vertical travel times through the near-surface structures. These vertical travel times can be used to correct the collected data for distortions caused by the near-surface velocity model. The statics associated with the near-surface velocity model is called long-wavelength statics, and the remaining small magnitude of statics derived from data or model is called short-wavelength statics (or residual statics). The process of the calculation of statics and applying the statics to seismic traces is called statics corrections.

Another approach is to apply reversed wavefield propagation through the near-surface velocity model and correct the near-surface effects accordingly, namely, through wave-equation datuming. One can also incorporate the estimated near-surface velocity model directly into the entire velocity depth model for subsurface imaging, in which case, wave-equation datuming becomes a part of the depth imaging.

Regardless of the correction approach used, estimating an accurate near-surface velocity model is a critical step in seismic data processing. In many circumstances, it presents a major challenge in seismic exploration. One solution to the near-surface model building problem and deep model building problem is to use refraction data covering both shallow and deep subsurface information with short and long source-receiver offset.

In conventional seismic data processing of land or shallow marine data, picking the first breaks and conducting the near-surface travel time tomography are essential, but conducted as two separate processes. Quality control for picks, quality control for acquisition geometry, and correcting any identified problems may be conducted separately and by a user in-between the picking and tomography modeling.

Figure 2:
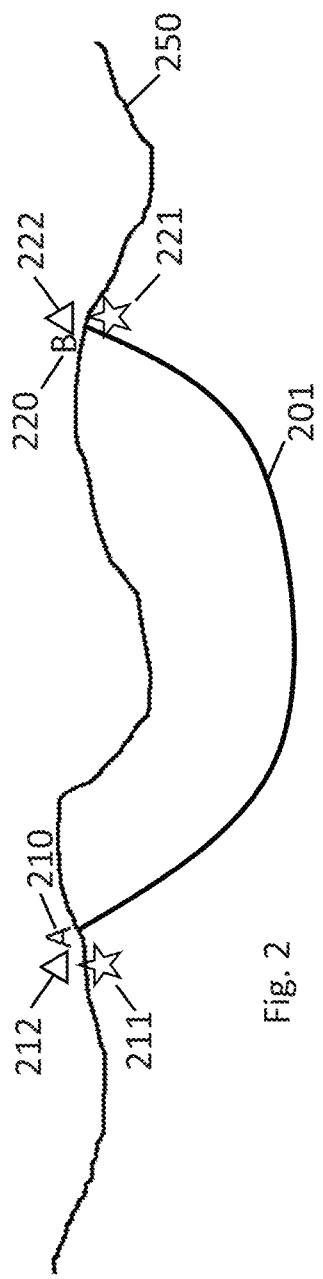
FIG. 2 shows a travel time of a seismic wave between two points.

FIG. 2 shows a travel time of a seismic wave between two points. The seismic wave's travel path 201 is associated with the time it takes the seismic wave to travel from source A 211 (represented by the star at point A 210) to receiver B 222 (represented by the triangle at point B 220). Under the travel time reciprocity theorem, the first-arrival travel time from a source A 211 to a receiver B 222 should be equal to the first-arrival travel time from a source B 221 to a receiver A 212, regardless of the complexity of the actual subsurface structures or the model used. A violation of the travel time reciprocity theorem may suggest the picks were incorrect or the source or receiver positions were incorrect. In actual practice, there is typically not a source B 221 at the receiver point B 222 or a source A 211 at the receiver point A 212. Instead, reciprocal pairs can be established based on interpolation using other nearby receiver travel times.

The travel time reciprocity theorem may be used to quality control first-break picks. If the travel time of the first-break pick is not approximately the same as the interpolated reciprocal travel time of the same pick, then the pick may be discarded as likely being a bad pick.

Figure 3:
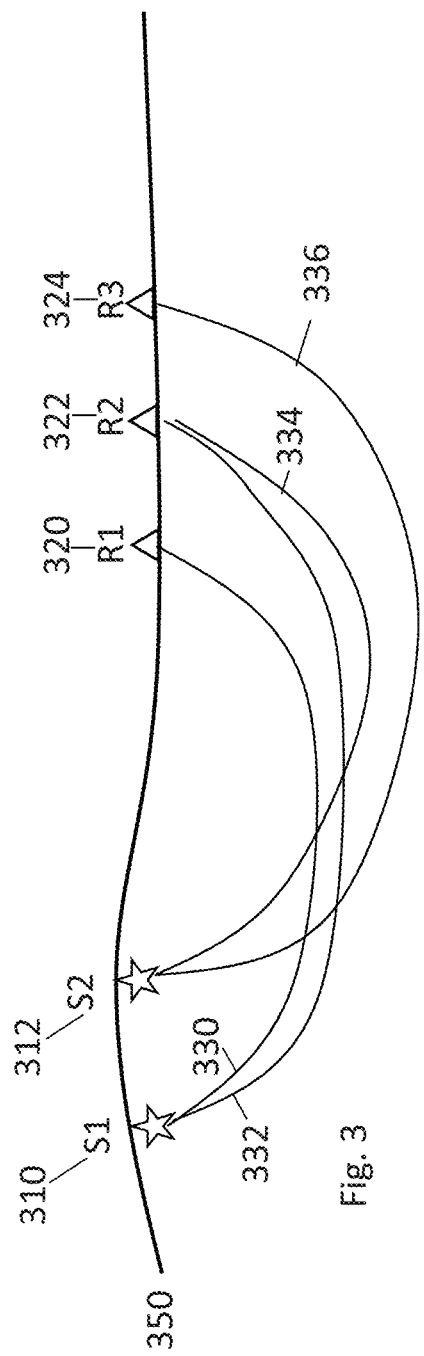
FIG. 3 shows a travel time of seismic waves between multiple sources and multiple receivers.

FIG. 3 shows a travel time of seismic waves between multiple sources and multiple receivers. A first source (S1 310) and a second source (S2 312) may be in locations nearby each other (such as within 50 meters). A first receiver (R1 320), a second receiver (R2 322), and a third receiver (R3 324) may be in locations nearby each other. Under the Shot Similarity Theorem, if the shot-receiver offset and orientation from source S1 310 to receiver R1 320 is approximately the same as the shot-receiver offset and orientation from source S2 312 to receiver R2 322, and the shot interval between S1 310 and S2 312 is sufficiently small (such as 50 meters or less), then the first-arrival travel time 330 between S1 310 and R1 320 should be approximately the same as the first-arrival travel time 334 between S2 312 and R2 322. Similarly, if another receiver, R3 324, is at approximately the same interval and orientation from R2 322 as the interval from R1 320 to R2 322, the first-arrival travel time 332 between S1 310 and R2 322 should be approximately the same as the first-arrival travel time 336 between S2 312 and R3 324. In such circumstances, shot S1 310 and shot S2 312 are called a Similarity Pair Shot to each other.

The Shot Similarity Theorem can be used to quality control first-break picks. If the travel times of similar shots are very different, it suggests incorrect picks or incorrect geometry. To compare the travel times, one can calculate the RMS (Root-Mean-Square) value of the differences between the travel times of a selected shot and all of its Similarity Pair Shots. If the RMS difference is too large, it suggests the travel time of this shot is incorrect, and the corresponding pick should be rejected. This Shot Similarity Theorem, its application, and its associated configuration of sources and receivers may be used with any number of sources greater than one and any number of receivers greater than one.

Figure 4:
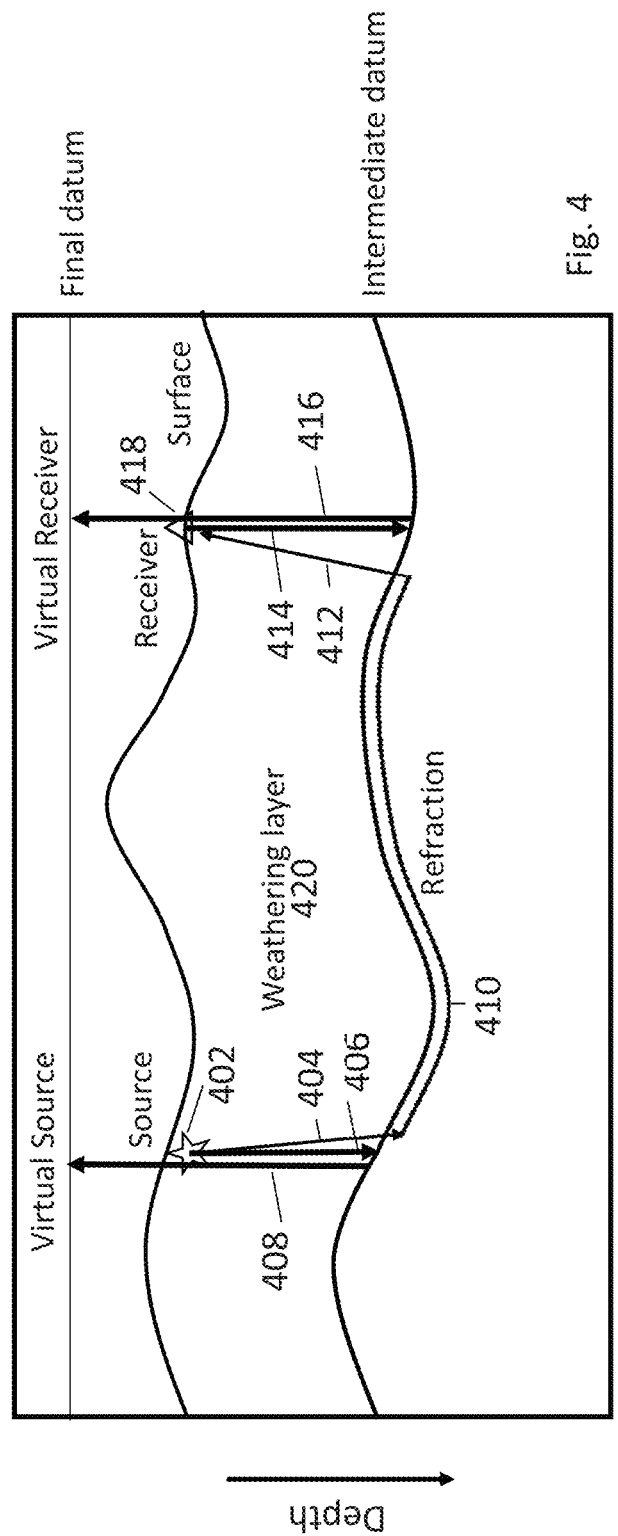
FIG. 4 shows a path over which statics optimization may take place.

FIG. 4 shows a path over which statics optimization may take place. The near surface weathering layer 420 shifts seismic reflection signals from the deep reflectors with lateral variation times, namely, statics. Statics correction is an effort to remove the effects of weathering layer 420 on the seismic reflection data. For making statics corrections, FIG. 4 includes two seismic datum: intermediate datum, where seismic sources and receivers shall be shifted down to using the weathering layer velocities, and the final datum, where seismic sources and receivers from the intermediate datum shall be shifted to using a constant replacement velocity. This process is effectively replacing seismic sources and receivers on the final datum with the removal of the weathering layer 420. A seismic refraction from the Source 402 to the Receiver 418, including the near-vertical path 404, path along the refractor or intermediate datum 410, and the near-vertical path 412. A downward vertical travel time correction along path 406 and then upward vertical travel time correction along path 408 approximately remove the ray path 404 and place source at the final datum, and a downward vertical travel time correction along path 414 and then upward vertical travel time correction along path 416 approximately remove the ray path 412 and also place receiver at the final datum. In most cases, the intermediate datum varies, causing long-wavelength statics. By including the downward vertical paths 406, 416 and upward vertical paths 408, 416, the statics optimization may be valid for any shape of intermediate datum. Statics may be calculated using a velocity model. Travel times in multiple domains (Common Shot Gather (CSG), Common Receiver Gather (CRG), Common-Midpoint Panel (CMP), or Common-Offset Gather (COG)) with statics applied should be smooth since travel time shifts due to statics are removed. Thus, the following objective function is established:

$$\Phi(m)=\|d-G(m)\|^2+\alpha\|D_x(d_s-T_s(m)-T_r(m))\|^2+\beta\|L(m)\|^2 \quad (1)$$

In equation (1), d is the picked CSG travel times, G(m) is the calculated travel times using velocity model m, $D_x$ is a first-order derivative operator over distance, $d_s$ is the travel time data sorted into CSG, CRG, CMP, or COG gathers, $T_s$ is the total shot statics including both down-going and up-going corrections associated with model m, $T_r$ is the total receiver statics including both down-going and up-going corrections associated with model m, L is a Laplacian operator, and α and β are the scaling factors for the second and third terms. Minimizing the above objective function will produce a velocity model that fits travel time data and also ensures statics effective for correcting the influence of the near-surface structures in the weathering layer 420.

Figure 5:
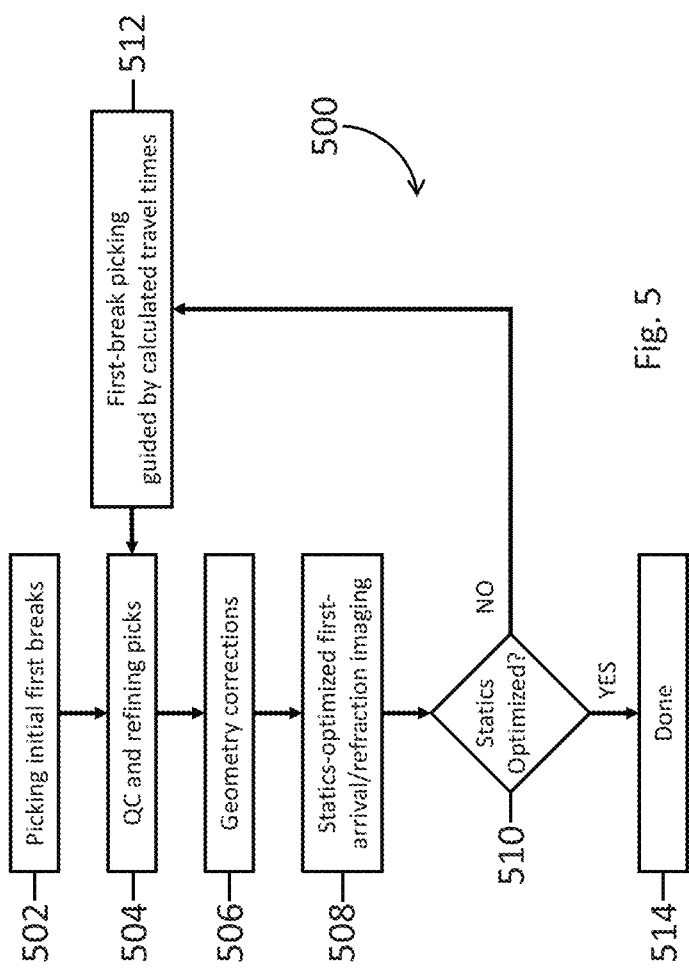
FIG. 5 shows a flow chart for a method.

FIG. 5 shows a flow chart for a method 500. Method 500 includes picking initial first breaks (block 502) from seismic data, QC and refining picks (block 504), performing geometry corrections (block 506), performing statics-optimized first-arrival/refraction imaging (block (508), and checking if the statics are optimized (510). If the statics are optimized (block 510) (YES), being done (block 514). If the statics are not optimized (block 510) (NO), performing first-break picking guided by calculated travel times (block 512) and performing QC and refining the new picks (block 504). The first-breaks picked guided by the calculated travel times (block 512) may have zero or some overlap with the initial first break picks (block 502).

The initial set of first breaks can be picked by a user, automatically such as being picked by an algorithm (such as one that tracks the phase and amplitude of the first arrivals across neighboring traces and finds the onset of the first arrivals along the seismic trace), or semi-automatically by a user picking some breaks and automating the picking of the remaining breaks.

QC is performed on the picks in order to refine them (block 504). For example, a pick that occurs outside of a certain time window in which first breaks are expected is likely a bad pick and may be discarded.

Incorrect geometry can be identified and corrected (block 506). The geometry may be incorrect as a source or receiver was not placed at the designed location for the seismic survey. This misplacement may be due to physical obstacles preventing the designed placement or other errors and may not be documented. Such errors may be identified and corrected through analysis of the first breaks.

Statics-optimized first-arrival/refraction imaging (block 508) may be performed to model the near-surface velocity structures with statics constraints applied as the second term in equation (1). A velocity model may be created based on the picks to estimate the near-surface structures, as disclosed elsewhere in this specification. The velocity model can be used to calculate the first arrival/refraction travel times. The long-wavelength and short-wavelength statics may also be calculated. Statics effects are explicitly imposed in the objective function (equation (1)) so that the inversion results ensure that statics can effectively remove variations in the long-offset refractions, which have similar raypaths to reflections in the weathering layer.

Further quality control can be performed on the statics (block 510) to potentially refine the first-break picks and velocity model. If the quality control of the statics (block 510) determines the statics are sufficiently optimized, the method 500 is done (block 514). Other methods may be performed after method 500, and method 500 may be performed again after the method 500 is done. If quality control of the statics (block 510) determines the statics are not sufficiently optimized, another set of improved first breaks may be picked based on calculated travel times, estimated reciprocal travel times, and the Shot Similarity Theorem (block 512). The calculated travel times, estimated reciprocal travel times, and the Shot Similarity Theorem can identify poor picks that should not be selected for imaging in the current iteration and that should be improved in picking in the next iteration. Calculated travel times may be used to set a time range in which to pick the data, offer time corrections to the data, and help flatten the first arrivals by subtracting the calculated times for easier picking. This new set of first break picks may be quality controlled and refined as part of an iterative process (block 504) until the quality control of the statics (Block 510) determines they are sufficiently optimized to end (block 514) the method 500. The final output from the method 500 of FIG. 5 may include: first break picks; early arrival waveforms, geometry corrections; near-surface velocity model; long-wavelength statics solutions; and short-wavelength statics solutions.

In some instances, it may be necessary to lower the required level of statics optimization with subsequent iterations. In other instances, it may be necessary to end the process after a number of iterations without any sufficient changes in optimized statics.

The iterative process allows additional mechanisms to quality control and refine first-break picks (block 504). The near-surface velocity model created during a previous iteration may be used to calculate travel times, which may be used to guide the picking of first breaks. The calculated travel times can indicate a time window to examine to identify good first-break picks, which can be used to constrain the picking of first breaks. Additionally, the calculated travel times can be applied as time shifts for traces, which can be subtracted from the original data, helping to flatten the first arrivals and improve the picking of first breaks. Additional picks of first breaks may be necessary to fill holes created by discarding first-break picks, but can similarly be guided by calculated travel times, estimated reciprocal travel times, or the Shot Similarity Sheorem on the second or subsequent iterations. With the iterative improvements on the model accuracy, the calculated travel times are more accurate.

The iterative process also allows additional mechanisms for identifying and correcting geometry errors. On the second or subsequent iterations, if a common shot or common receiver is consistently producing pick errors, then a shot or receiver position correction may be calculated using the near offset travel times of direct waves and applying the geometry corrections to the shot or receiver.

The quality control of the statics (block 510) may use one or more quality control mechanisms to determine if the statics are sufficiently optimized. For example, the near-surface velocity model can be used to calculate long-wavelength statics corrections and travel times for the shot and receiver positions. The calculated travel times using the final velocity model should match the actual travel times of the first-break picks, except for a small misfit for some traces on the order of 20 milliseconds or less. These misfits are typically caused by small velocity structures beneath sources or receivers. An assumption (called surface consistency) may be made that each source and receiver point has an associated fixed small time shift. This assumes that the time shift for a receiver is the same, even using different sources, and that the time shift for a source is the same, even using different receivers. The differences between the calculated travel times and the actual travel times may be used to create short-wavelength statics by inverting them by a Gauss-Seidel method, using the surface consistency assumption. The total statics for a source or receiver is the sum of the long-wavelength statics and the short-wavelength statics. The total statics is applied to current travel time picks or the first arrival waveforms, and variations of the first arrivals are calculated in common shot domain, common receiver domain, common offset domain, and/or common midpoint domain. If the smoothness of the first arrivals corrected by statics is sufficient, the statics may be sufficiently optimized.

Performing the iterative process of modeling near-surface structures, such as is discussed in connection with FIG. 5, may solve picking, pick quality control, geometry quality control, near surface imaging, and statics problems all together. These problems are inherently tied together and influence one another. Addressing them together in an iterative process may deliver five results at the same time and with better quality than addressing them each individually.

In either an iterative of non-iterative approach, first-break picking may be performed by a user, automatically, or semi-automatically. In manual picking, a user picks each of the first breaks to use. In automatic picking, algorithms use the seismic phase and amplitude information from one or more traces to estimate the first-break times without much user involvement. In automatic picking, a user may pick a number of seeds (partial data) from the data that are then factored into the automatic picking.

In semi-automatic picking, if partial seeds need to be picked, the rest of data is picked automatically. The method is often called semi-automatic picking, which requires more manpower than automatic picking, but much less than true manual picking.

The algorithms for automatic or semi-automatic picking may utilize the phase and amplitude information of the first arriving waves (the first arrivals), and may seek consistent moveout of the phases and amplitudes across different seismic traces to help picking. For land or shallow marine data, the first arrivals may be highly contaminated by noise or strongly attenuated by the near-surface weathering layer, thus picking the first breaks with a semi- or fully-automatic data-based picking approach may be very difficult.

Figure 6:
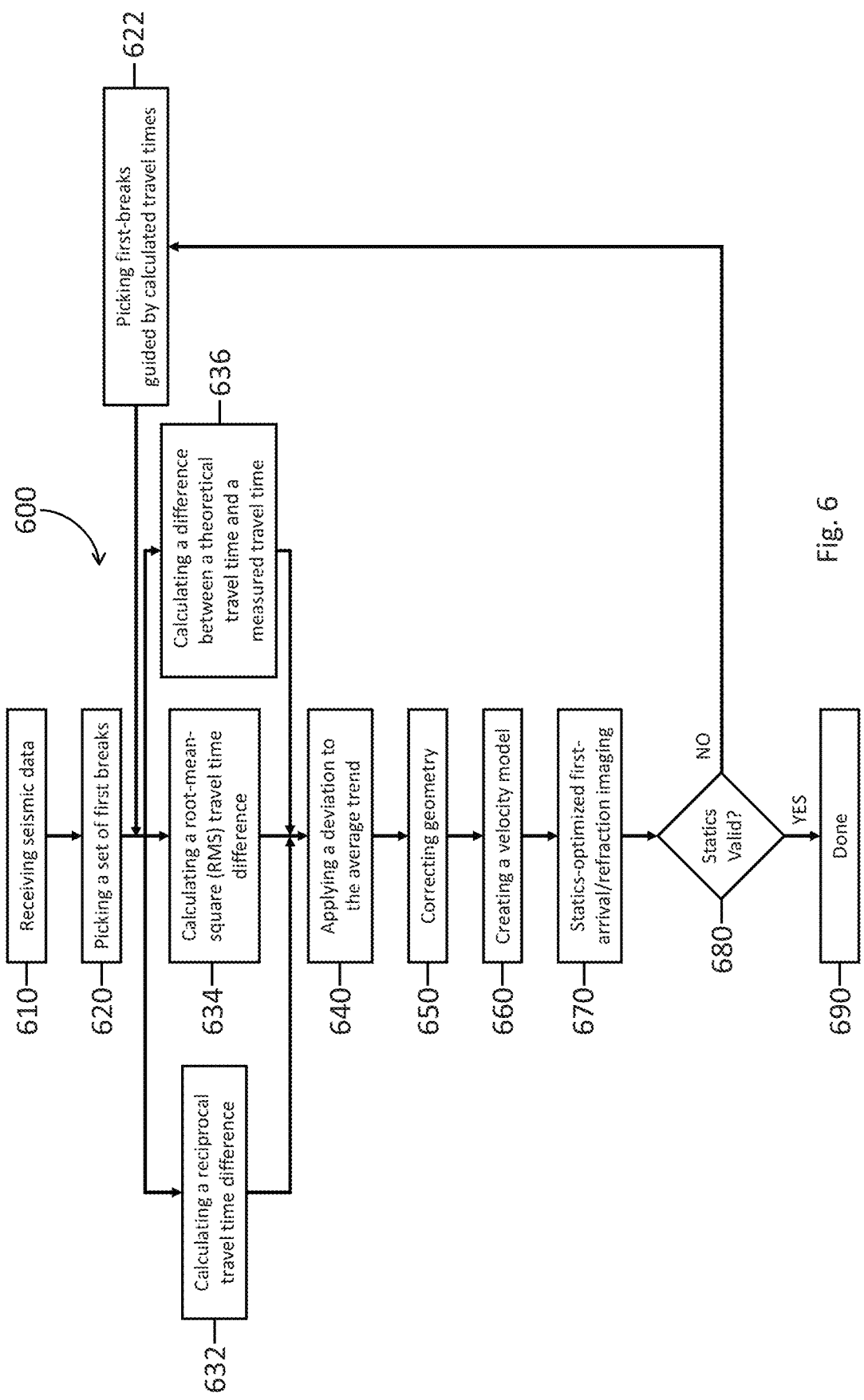
FIG. 6 shows a flow chart for a method.

FIG. 6 shows a flow chart for a method 600. Method 600 includes receiving seismic data (block 610) and picking a set of first breaks (block 620). Method 600 includes performing at least one of: calculating a reciprocal travel time difference (block 632), calculating a RMS travel time difference (block 634), and calculating a difference between a theoretical travel time and a measured travel time (block 636). In various embodiments, two or all three of these calculating of travel time differences (blocks 632, 634, 636) may be performed. Method 600 includes applying a deviation to the average trend (block 640) to the calculated travel times, to correct the travel times to the same magnitude order. Method 600 includes creating a velocity model (block 660), for example, by using the set of first breaks. Method 600 includes performing statics-optimized first-arrival/refraction imaging (block 670). This may include calculating long- and short-wavelength statics, based on the velocity model and set of first break picks. Method 600 includes checking if the statics are valid (block 680), which may include both the long- and short-wavelength statics and determining they are sufficiently optimized. If the statics are valid (block 680) (YES), the method 600 may be done (block 690). Other methods may be performed after method 600 is done (block 690). And method 600 may be performed again after method 600 is done (block 690). The method includes picking first breaks guided by calculated travel times (block 622), which may include basing the picks on the geometry corrections, velocity model, and statics. If the statics are not valid (block 680) (NO), method 600 preforms the picking first breaks guided by calculated travel times (block 622), which may replace the set of first breaks picked earlier in the method or just replace individual first breaks.

In various embodiments, method 600 may include multiple loops, such as a loop over the picking a set of first breaks (block 620), calculating travel time differences (blocks 632, 634, 636), and applying a deviation to the average trend (block 640). Method 600 may pick first breaks, determine if the first breaks are valid, and pick replacement first breaks multiple times before creating a velocity model (block 660).

Figure 7:
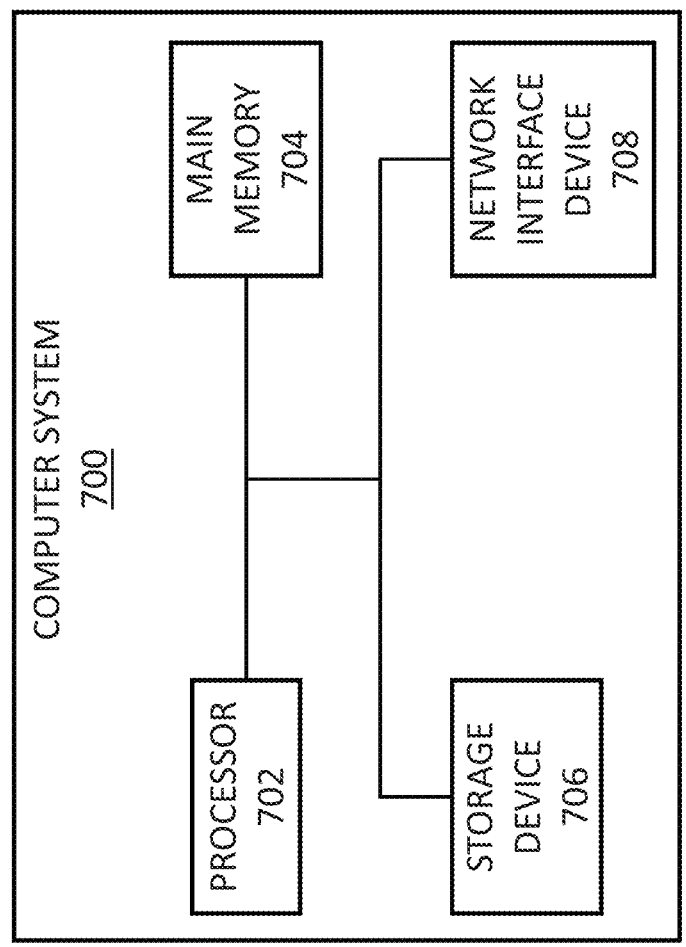
FIG. 7 shows, in block diagram form, a computer system in accordance with at least some embodiments.

FIG. 7, shows a computer system 700 which is illustrative of a computer. The computer system 700 may be illustrative of, for example, a laptop, a desktop computer, a computer within a node of several computers, or any other computing system that may be connected to a network of computers. The computer system 700 comprises a processor 702, and a main memory 704 coupled to processor 702. Additionally, processor 702 and main memory 704 may be coupled to a storage device 706, and a network interface device 708.

Programs executable by the processor 702 may be stored on the storage device 706 (e.g., a hard drive, solid state disk, memory stick, optical disc), and accessed when needed by the processor 702. Programs stored on the storage device 706 may comprise programs to implement various processes or methods on the computer system 700. In some cases, the programs are copied from the storage device 706 to the main memory 704, and the programs are executed from the main memory 704. Thus, both the main memory 704 and storage device 706 may be considered computer-readable storage mediums.

In various embodiments, the network interface device 708 may allow the computer system 700 to exchange data over a wireless or wired network. In some embodiments the computer system 700 may be connected to a plurality of other computers within a shared network. Thus, while many aspects may be performed serially, various embodiments enable parallel processing to speed up the overall processing time. Forward ray tracing and waveform modelling for shots may comprise major computations elements, however these procedures may be performed in parallel processes. Additionally, the conjugate gradient approach may be performed in a parallel manner such that intermediate results are only stored locally, and need not be communicated among different computing nodes.

Figure 8:
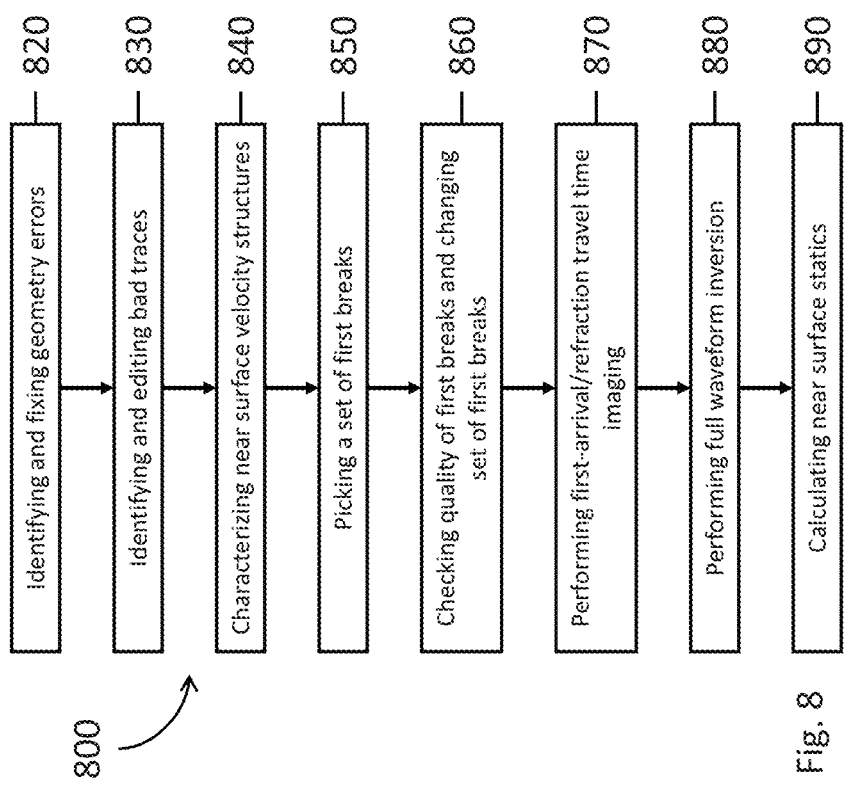
FIG. 8 shows a flow chart for a method of creating a velocity model and near-surface statics calculations.

FIG. 8 shows a flow chart 800 for a method of creating a velocity model and near-surface statics calculations. Method 800 includes identifying and fixing geometry errors 820. Method 800 includes identifying and editing bad traces 830. Method 800 includes characterizing near surface velocity structures 840. Method 800 includes picking a set of first breaks 850. Method 800 includes checking quality of first breaks and changing set of first breaks 860. Method 800 includes performing first-arrival/refraction travel time imaging 870. Method 800 includes performing full waveform inversion 880. Method 800 includes calculating near surface statics 890.

Identifying and fixing geometry errors 820 may includes identifying sources and receivers with geometry errors through machine learning. Traces within a near shot-receiver offset range may be selected for common shot gathers, in which the first arrivals are the direct waves. A Linear Moveout (LMO) correction may be applied to the common shot gather, using an estimated velocity of the direct wave and display traces according to the offset range. A gather with irregularly shifted first arrivals indicates shot geometry errors. A gather with smooth and continuous first arrivals suggests no or minimal errors in shot location. The above process may also be performed for a common receiver gather to identify any receiver geometry errors.

A grid search algorithm may be used to correct a shot or receiver location, such as a location identified by applying machine learning to a common shot gather or common receiver gather. By testing a variety of potential grid locations near the erroneous shot or receiver location, an estimated corrected location may be determined. Machine learning may be used to help identify which corrected location allows the optimal data pattern after the location correction is made.

Identifying and editing bad traces 830 may be performed with machine learning. Seismic data may include bad traces due to environment interferences or recording system malfunctions. Bad traces may be identified and fixed or removed before performing further data processing. If the bad traces are not fixed or removed, subsequent processing may produce incorrect results. Machine learning may be used to identify bad traces automatically from the raw data.

Characterizing near surface velocity structures 840 may include scanning the seismic waveform data to estimate the near-surface complexity by telling layered, gradient, or velocity reversal structures under each shot or receiver point. Such information may offer guidance for the selection of methods and parameters for the first-break picking and structure imaging.

Picking a set of first breaks 850 may combine both conventional seismic picking and machine learning approaches. Given a gather of traces in common shot, common receiver, or common offset domain, a time window across all traces that narrows down the first arrivals may be determined by linear moveout corrections, calculated travel times using a velocity model, picks associated with a nearby shot or receiver, and/or reciprocal picks. Within the time window, algorithms such as STA/LTA ratio detection for the first break, signal detection by analyzing fractal dimension along the trace, may help pick an individual trace; and algorithms such as tracking lateral phase and amplitude moveout across neighboring traces may help pick multiple traces with cross information utilized. All these methods may be applied to generate training data for machine learning to identify the pattern of the first arrivals.

Checking quality of first breaks and changing set of first breaks 860 may be performed by applying machine learning. Checking quality of first breaks may be performed on the waveforms with the picks applied to line up the first arrivals. Travel time based quality checking may be performed by applying geophysics. Quality checking for picking first breaks may also be conducted to analyze the picks in order to refine the picks to be used. Three criteria may be applied to identify bad picks: (1) a pick that occurs outside of a certain time window in which first breaks are expected; (2) a pick that is too much off to the average reciprocal time of the neighboring shots (applying Reciprocal Theorem—from existing geophysics); or (3) a pick that is too much off to one from a neighboring shot to a neighboring receiver at the same shot-receiver distance and orientation (applying Similarity Theorem—proposed in this invention). These quality control mechanisms for picks are discussed elsewhere in this specification. As the bad first-break picks are removed, missing picks may be replaced by utilizing remaining good picks and the waveform data.

Figure 9:
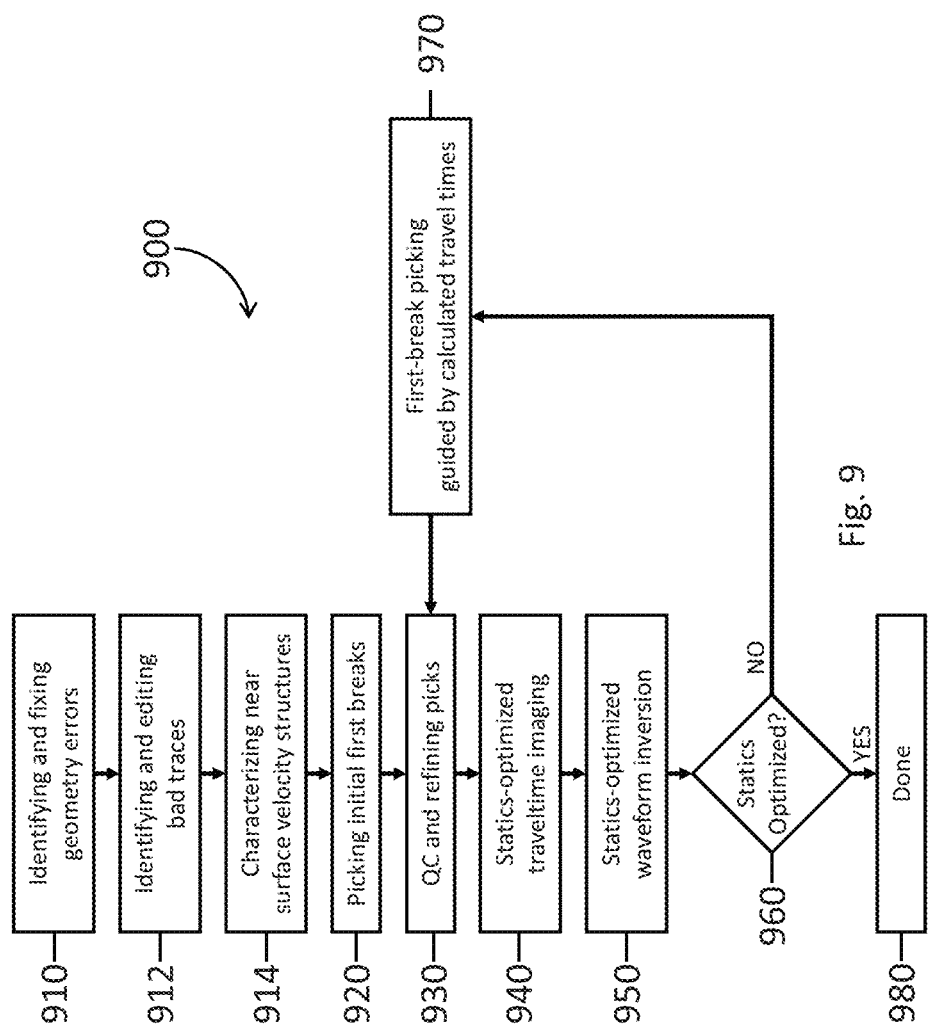
FIG. 9 shows a flow chart for a method of creating a velocity model and near-surface statics calculations.

FIG. 9 shows a flow chart for a method 900 of creating a velocity model and near-surface statics calculations. Method 900 includes identifying and fixing geometry errors 910. Method 900 includes identifying and editing bad traces 912. Method 900 includes characterizing near surface velocity structures 914. Method 900 includes picking initial first breaks 920. Method 900 includes QC (quality control) and refining picks 930. Method 900 includes statics-optimized traveltime imaging 940. Method 900 includes statics-optimized waveform inversion 950. Method 900 includes determining if the statics are optimized 960. Method 900 includes first-break picking guided by calculated traveltimes 970. If statics are optimized ("YES"), method 900 may move from determining if the statics are optimized 960 to being done 980. If the statics are not optimized ("NO"), method 900 may move from determining if the statics are optimized 960 to first-break picking guided by calculated traveltimes 970. Method 900 may iterate the process until determining if the statics are optimized 960 is a "YES."

Characterizing near surface velocity structures 914 may include identifying the surveyed area as including layered, gradients, or velocity reversal structures under the shots.

QC and refining picks 930 may include the application of machine learning to identify and remove outliers in picks. A picking algorithm may be used to replace the picks removed as outliers. QC and refining picks 930 may include analyzing the travel time picks without waveforms. This may include checking whether a pick occurs outside of a certain time window that is expected by a preset range or by calculated travel times (calculated travel times using a velocity model will be available during the travel time imaging), applying the reciprocity theorem, or applying the shot similarity theorem.

Statics-optimized waveform inversion may include the application of full waveform inversion to a starting model developed by the statics-optimized traveltime imaging 940. The model solution is also constrained by the long-wavelength statics as in the same manner in the traveltime imaging.

Figure 10:
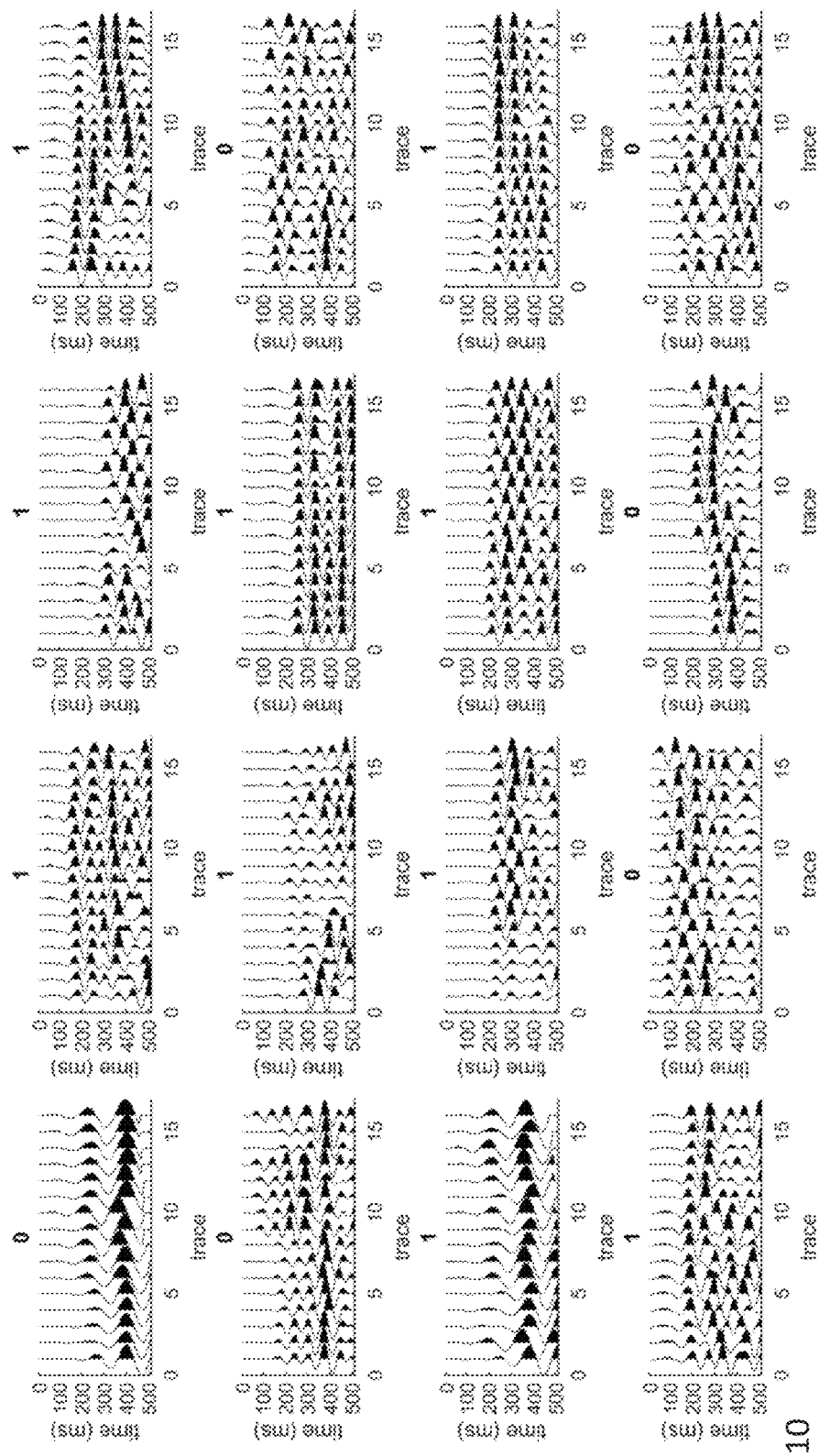
FIG. 10 shows training data examples for machine learning of geometry correction.

FIG. 10 shows training data examples for machine learning of geometry correction. The graphs show examples of machine learning for identifying geometry errors by applying LMO correction to common shot gathers or common receiver gathers. The gathers marked with "0" may be shots with geometry errors, and the gathers marked with "1" may be the shots without geometry errors. Training data for such machine learning can be selected from the same survey or different surveys. A deep convolutional neural network (CNN) may be applied to the training data.

Figure 11:
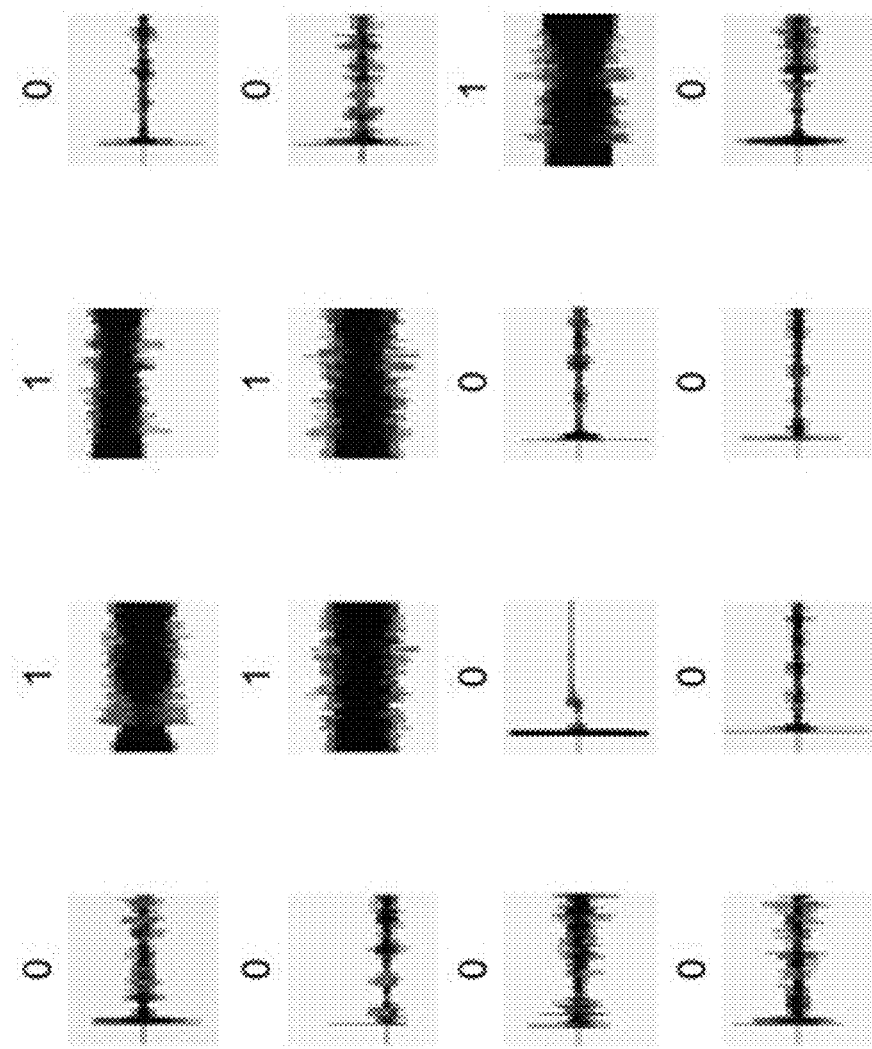
FIG. 11 shows training data examples for machine learning of trace editing.

FIG. 11 shows training data examples for machine learning of trace editing. The traces marked with "0" may be bad, and the traces marked with "1" may not be bad. Once bad traces are identified, a set of preset processing functions such as filters may be applied to process the trace, and the result may be evaluated again by the machine learning system to decide if the processed trace was sufficiently corrected or should be removed from the dataset.

Figure 12:
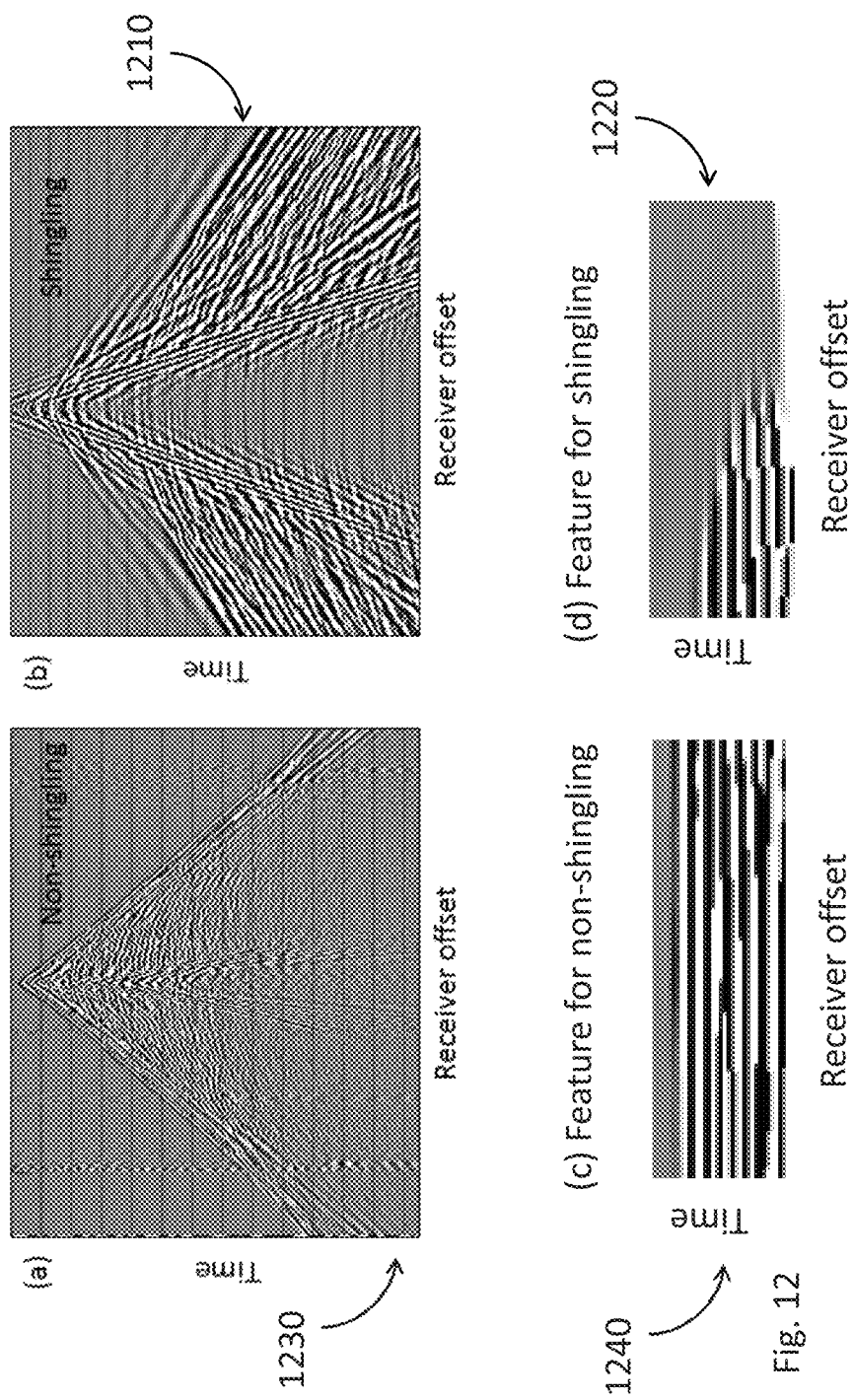
FIG. 12 shows machine learning of site characterization.

FIG. 12 shows machine learning of site characterization. Shingling versus non-shingling is shown for first arrivals of shot records. Machine learning may identify the shingling of arrivals, such as shown in the shingling graph 1210. Shingling may be caused by velocity reversal, such as a sandwiched high velocity layer. Machine learning may estimate a feature display for shingling 1220. Non-shingling may also be identified by machine learning, such as shown in the non-shingling graph 1230. Machine learning may estimate a feature display for non-shingling 1240. LMO may be applied in estimating a feature display. If a shingling shot is identified, the first-break picking may be limited to the near receiver offset. Picks for the far offset may be the later-arrival refraction travel times, which should be applied for refraction travel-time imaging rather than the first-arrival travel-time imaging.

Figure 13:
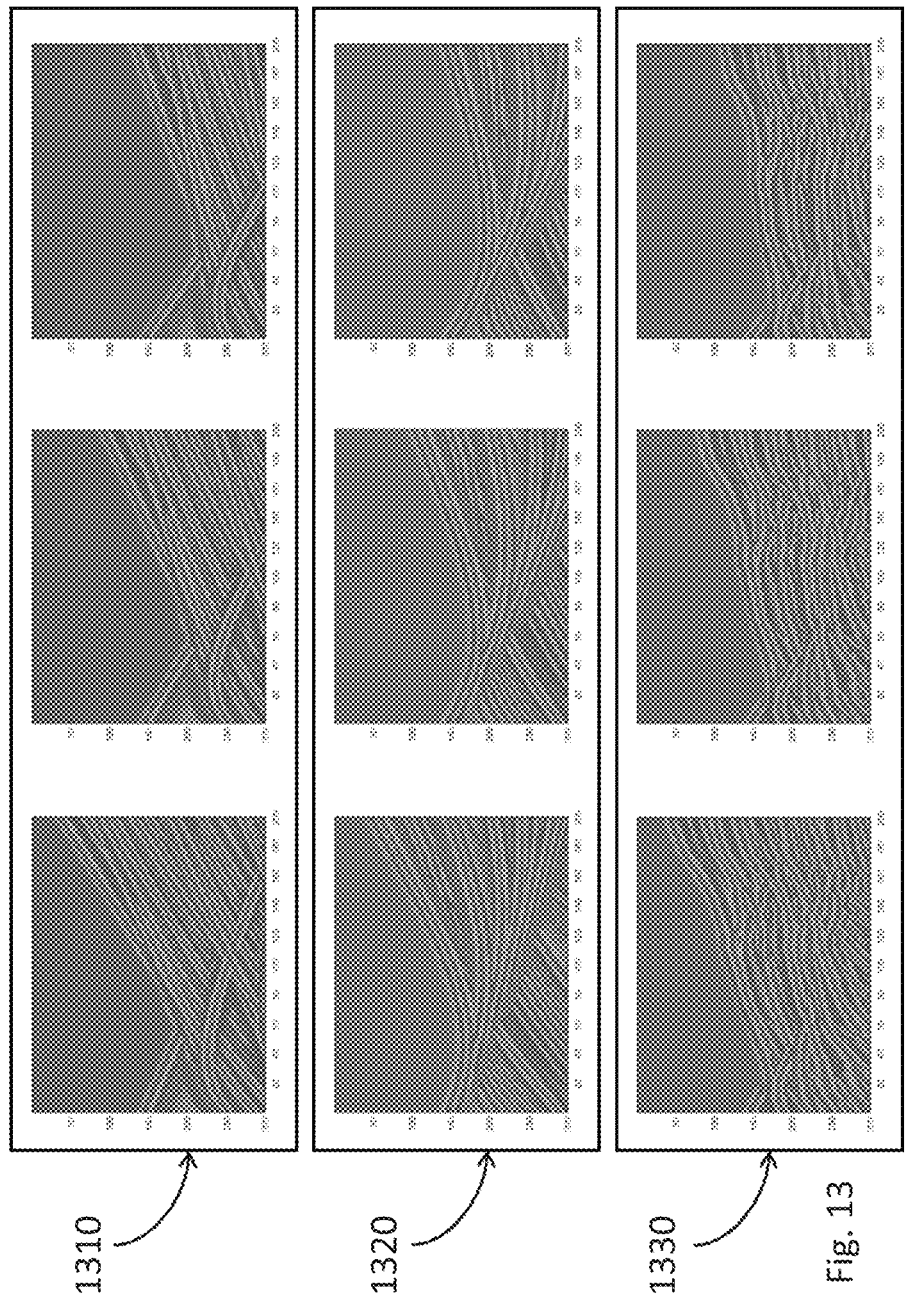
FIG. 13 shows machine learning of site characterization of non-shingling first arrivals.

FIG. 13 shows machine learning of site characterization of non-shingling first arrivals. Non-shingling data types may be further categorized to correspond to a layered model, gradient model, or complex model. The top three graphs 1310 may correspond to layered models. The middle three graphs 1320 may correspond to gradient models. The bottom three graphs 1330 may correspond to complex models. In total, there are four features labeled for charactering the near surface structures.

Figure 14:
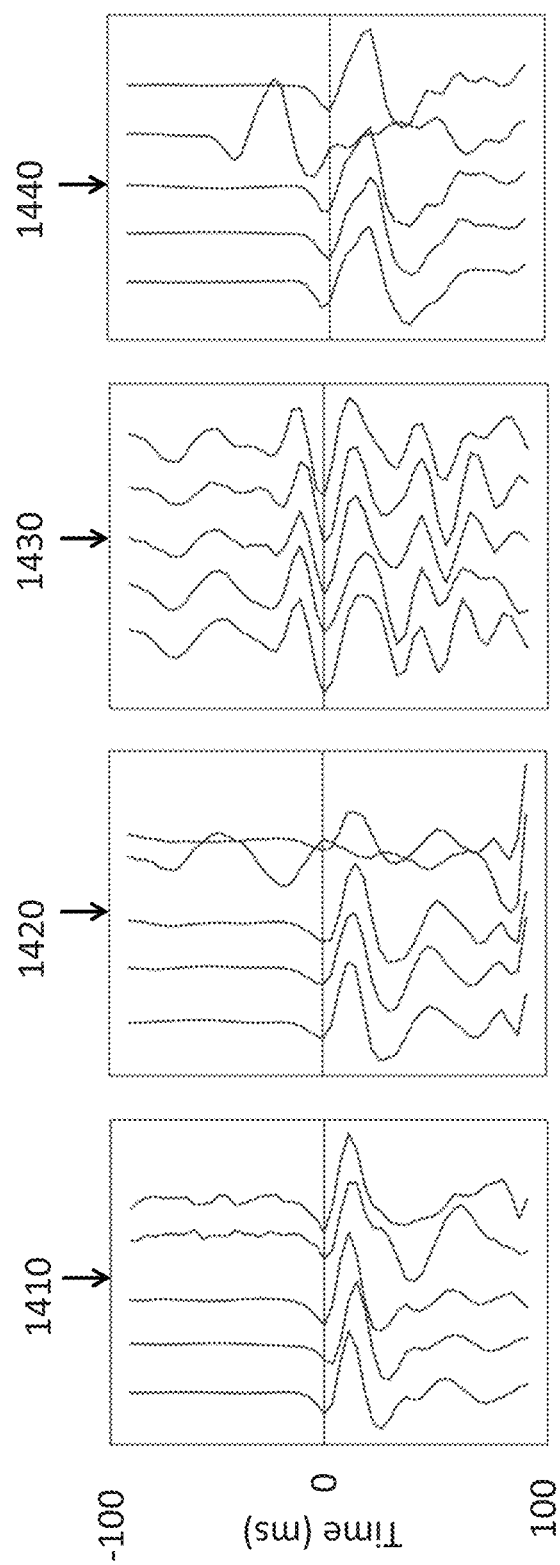
FIG. 14 shows machine learning of quality control of first break picking.

FIG. 14 shows machine learning of quality control of first break picking. Graphs 1410, 1420, 1430, 1430 may be created by shifting all traces to the same time line by the picked travel times. Graphs 1420, 1440 show where certain picks may be bad. A bad pick may cause traces to shift and the phases of the first arrivals to be mismatched. Graphs 1410, 1430 show where picks may be good. The first arrivals may be in phase and line up. A large number of training data samples may be needed for applying machine learning methods so that the system learns and becomes robust, but the training data do not need to come from the same project. After pick outliers are identified, they may be fixed by applying travel time based quality control, or by shifting picks with a trial-and-error method and employing machine learning to identify optimal picks.

Figure 15:
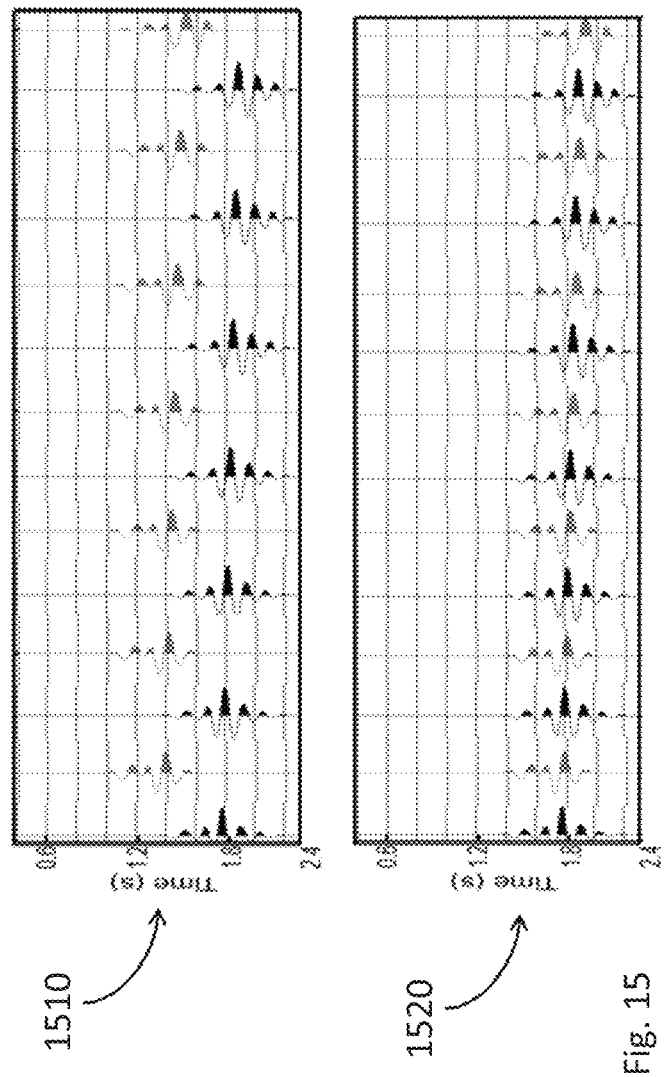
FIG. 15 shows machine learning of identification of cycle skipping in full waveform inversion.

FIG. 15 shows machine learning of identification of cycle skipping in full waveform inversion. Example graph 1510 shows training data using cycle skipping. Example graph 1520 shows training data without cycle skipping. Machine learning may be applied to identify the cycle skipping problem during the full waveform inversion. After each FWI iteration, selected real data and synthetics traces at different shot-receiver offset are displayed in a panel as features labeled for Machine learning. Example graphs 1510, 1520 include real data and synthetics displayed on a trace by trace comparison with LMO or first-break picks applied for corrections. When cycle skipping problems are identified by machine learning, the area and the depth of the zone in the velocity model that cause the cycle skipping problems are inferred, and the velocities in the area are modified following the direction of cycle skipping such that reduces the occurrence of cycle skipping. And then the forward modeling with partial shots is conducted with updated model to check the cycle skipping problems again. This could be an iterative process until the updated model can help avoid cycle skipping. Then, FWI may continue to proceed.

From the description provided herein, those skilled in the art are readily able to combine software with appropriate general-purpose or special-purpose computer hardware to create a computer system and/or computer subcomponents in accordance with the various embodiments and methods.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   a) generating a seismic wave in a subsurface formation using a source;
   b) receiving the seismic wave at a receiver, and providing seismic data responsive to the seismic wave;
   c) picking a current set of first breaks in the seismic data;
   d) creating a current velocity model based on the current set of first breaks;
   e) calculating long- and short-wavelength statics based on the current velocity model and the current set of first breaks;
   f) comparing a quality control indicator of the long- and short-wavelength statics to a threshold to determine whether the statics are sufficiently optimized;

responsive to determining that the statics are not sufficiently optimized in step f):
identifying an invalid first break of the current set of first breaks;
removing the invalid first break from the current set of first breaks;
picking a second set of first breaks in the seismic data;
adding the second set of first breaks to the -mu set of first breaks to generate a new set of first breaks;
creating a new velocity model based on the new set of first breaks and a statics constraint; and
returning to step e) with the generated new set of first breaks being the current set of first breaks, and the new velocity model being the current velocity model; and
responsive to determining that the statics are sufficiently optimized in step f), providing the current velocity model as an output; and
assessing a presence of hydrocarbons or minerals in a reservoir in earth based on the velocity model provided as an output.

2. The method of claim 1, wherein the source is a first source, wherein the receiver is a first receiver, and wherein identifying the invalid first break comprises:
determining a reciprocal travel time difference exceeds a first threshold, wherein the reciprocal travel time difference is a first difference between a first travel time from the first source to the first receiver and a second travel time from the first receiver to the first source, wherein the first source and the first receiver are associated with the invalid first break;
determining a root-mean-square (RMS) travel time difference exceeds a second threshold, wherein the RMS travel time difference is a second difference between the first travel time and a third travel time, wherein the third travel time is from a second source to a second receiver, wherein a first offset between the first and the second sources is approximately equal to a second offset between the first and second receivers;
or determining a third difference between a theoretical travel time associated with the invalid first break and a measured travel time associated with the invalid first break exceeds a third threshold.

3. The method of claim 2, wherein the current set of first breaks comprises multiple first breaks, wherein the invalid first break is a first invalid first break, and the method comprising,
responsive to determining that the statics are not sufficiently optimized in step f):
identifying a second invalid first break of the current set of first breaks;
removing the second invalid first break from the current set of first breaks;
picking a third set of first breaks in the seismic data; and
adding the third set of first breaks to the current set of first breaks to generate the new set of first breaks.

4. The method of claim 2, comprising:
picking a third set of first breaks in the seismic data, wherein the third set of first breaks comprises a different number of first breaks than the current set of first breaks.

5. The method of claim 1, further comprising applying the statics to the current set of first breaks to determine whether the statics are sufficiently optimized.

6. The method of claim 4, wherein no first breaks in the current set of first breaks are in the third set of first breaks.

7. A method comprising:
a) generating a seismic wave in a near-surface velocity formation using a source;
b) receiving the seismic wave at a receiver, and providing seismic data responsive to the seismic wave;
c) picking a current set of first breaks in the seismic data;
d) creating a current velocity model based on the current set of first breaks using a first-arrival or refraction tomographic imaging method;
e) calculating long- and short-wavelength statics based on the current velocity model and the current set of first breaks;
f) comparing a quality control indicator of the long- and short-wavelength statics to a threshold to determine whether the statics are sufficiently optimized;
responsive to determining that the statics are not sufficiently optimized in step f):
applying a sum of the long-wavelength statics and the short-wavelength statics to the current set of first breaks to generate a new set of first breaks based on the current velocity model;
creating a new velocity model based on the new set of first breaks and a statics constraint; and
returning to step e) with the generated new set of first breaks being the current set of first breaks, and the new velocity model being the current velocity model; and
responsive to determining that the statics are sufficiently optimized in step f), providing the current velocity model as an output; and
assessing a presence of hydrocarbons or minerals in a reservoir in earth based on the velocity model provided as an output.

8. The method of claim 7, further comprising, responsive to determining that the statics are not sufficiently optimized in step f): adding a second set of first breaks to the current set of first breaks to generate the new set of first breaks, wherein the current set of first breaks comprises a first break, wherein the second set of first breaks comprises a second first break, and wherein the current set of first breaks does not include the second first break.

9. The method of claim 8, wherein the second set of first breaks further comprises the first break.

10. The method of claim 7, wherein creating the current velocity model or the new velocity model comprises one or more selected from a group consisting of:
a refraction delay-time method,
a refraction travel time migration,
a generalized linear inversion method,
a first-arrival travel time tomography,
a joint travel time and waveform tomography method,
a waveform inversion, and
a waveform envelope inversion.

11. The method of claim 7, further comprising:
identifying an invalid first break of the current set of first breaks;
determining the source or the receiver that caused the invalid first break; and
applying a shot similarity theorem to correct data related to the one of the source or the receiver that caused the invalid first break.

12. A system comprising:
a source configured to generate a seismic wave in an earthen formation;
a receiver configured to receive the seismic wave and to provide seismic data responsive to the seismic wave;
a processor coupled to the receiver;

a memory coupled to the processor and configured to store a program that, when executed by the processor, causes the processor to be configured to:
a) receive the seismic wave at a receiver, and providing seismic data responsive to the seismic wave;
b) pick a current set of first breaks in the seismic data;
c) create a current velocity model based on the current set of first breaks;
d) calculate long- and short-wavelength statics based on the current velocity model and the current set of first breaks;
e) compare a quality control indicator of the long- and short-wavelength statics to a threshold to determine whether the statics are sufficiently optimized;

responsive to determining that the statics are not sufficiently optimized in step e):
determine a first break of the current set of first breaks is invalid;
remove the invalid first break from the current set of first breaks;
pick a second set of first breaks in the seismic data;
add the second set of first breaks to the current set of first breaks to generate a new set of first breaks;
create a new velocity model based on the new set of first breaks and a statics constraint; and
return to step d) with the generated new set of first breaks being the current set of first breaks, and the new velocity model being the current velocity model; and responsive to determining that the statics are sufficiently optimized in step e),
provide the current velocity model as an output; and
assess a presence of hydrocarbons or minerals in a reservoir in earth based on the velocity model provided as an output.

13. The system of claim 12, wherein the source is a first source, wherein the receiver is a second receiver, and wherein the program, when executed by the processor, causes the processor to be configured to determine the first break in the current set of first breaks is invalid by:
determining a reciprocal travel time difference exceeds a first threshold, wherein the reciprocal travel time difference is a first difference between a first travel time from the first source to the first receiver and a second travel time from the first receiver to the first source, wherein the first source and the first receiver are associated with the first break;

determining a root-mean-square (RMS) travel time difference exceeds a second threshold, wherein the RMS travel time difference is s second difference between the first travel time and a third travel time, wherein the third travel time is from a second source to a second receiver, wherein a first offset between the first and the second sources is approximately equal to a second offset between the first and second receivers;
or determining a third difference between a theoretical travel time associated with the first break and a measured travel time associated with the first break exceeds a third threshold.

14. The system of claim 13, wherein the program, when executed by the processor, further causes the processor to be configured to determine the second set of first breaks is invalid.

15. The method of claim 4, further comprising correcting for misplacement of the first source, the second source, the first receiver, or the second receiver using the velocity model to determine statics for multiple domains.

16. The method of claim 15, wherein the multiple domains comprise one or more of a Common Shot Gather domain, a Common Receiver Gather domain, a Common-Midpoint Panel domain, or a Common-Offset Gather domain.

17. The method of claim 7, further comprising:
determining that the long- and short-wavelength statics do not minimize surface derivatives of the current set of first breaks;
determining that one of the source or the receiver causes a geometry error;
calculating a correction for the source or the receiver that causes the geometry error;
and applying the correction to the source or the receiver to correct the geometry error.

18. The system of claim 12, wherein the program, when executed by the processor, further causes the processor to be configured to:
identify a geometry error based on the invalid first break;
pick a third set of first breaks based on a time window of the seismic data, wherein the time window is based on the velocity model and corrects for the geometry error associated with the invalid first break; and
add the third set of first breaks to the current set of first breaks.

* * * * *